Patented May 26, 1925.

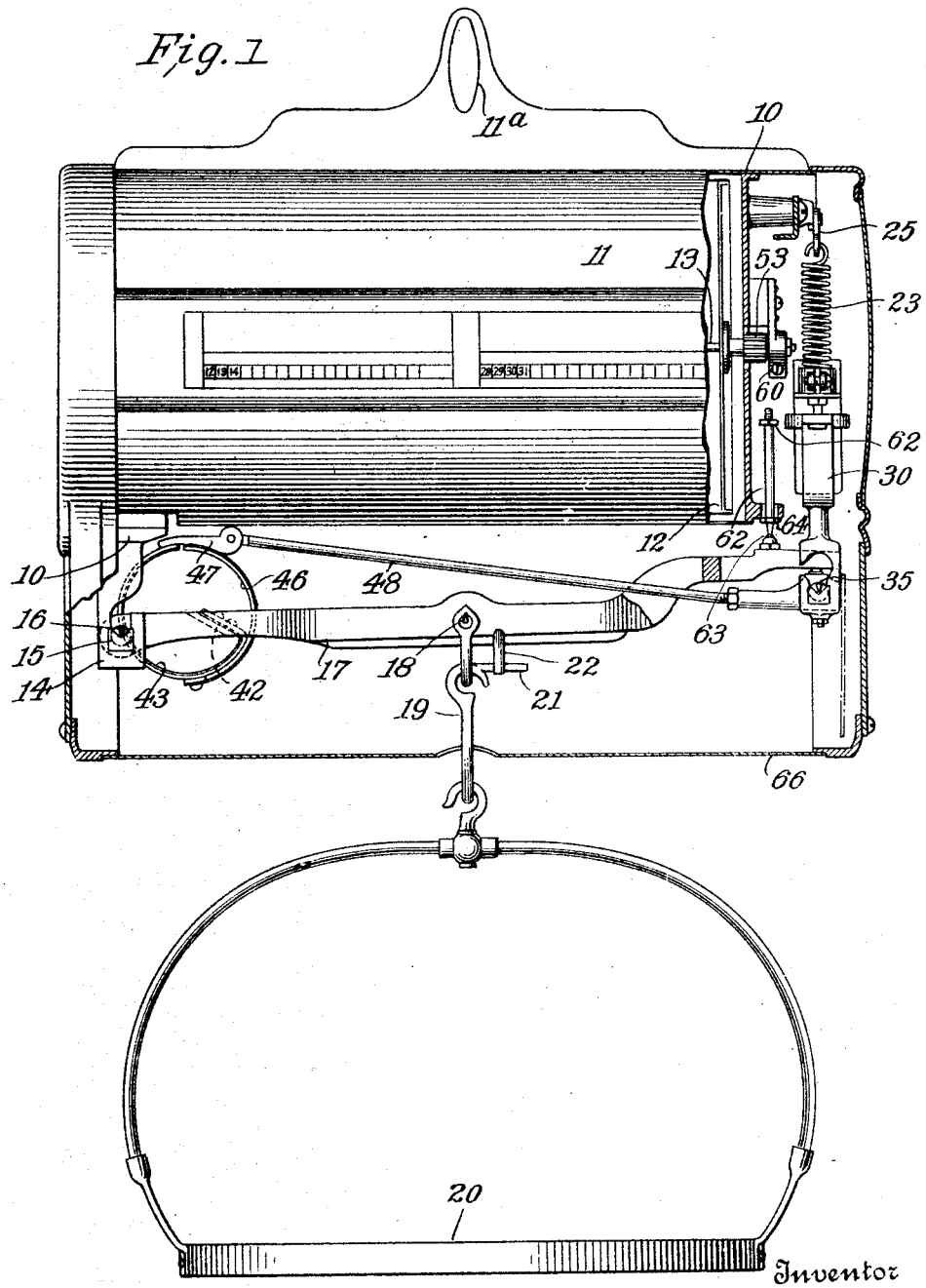

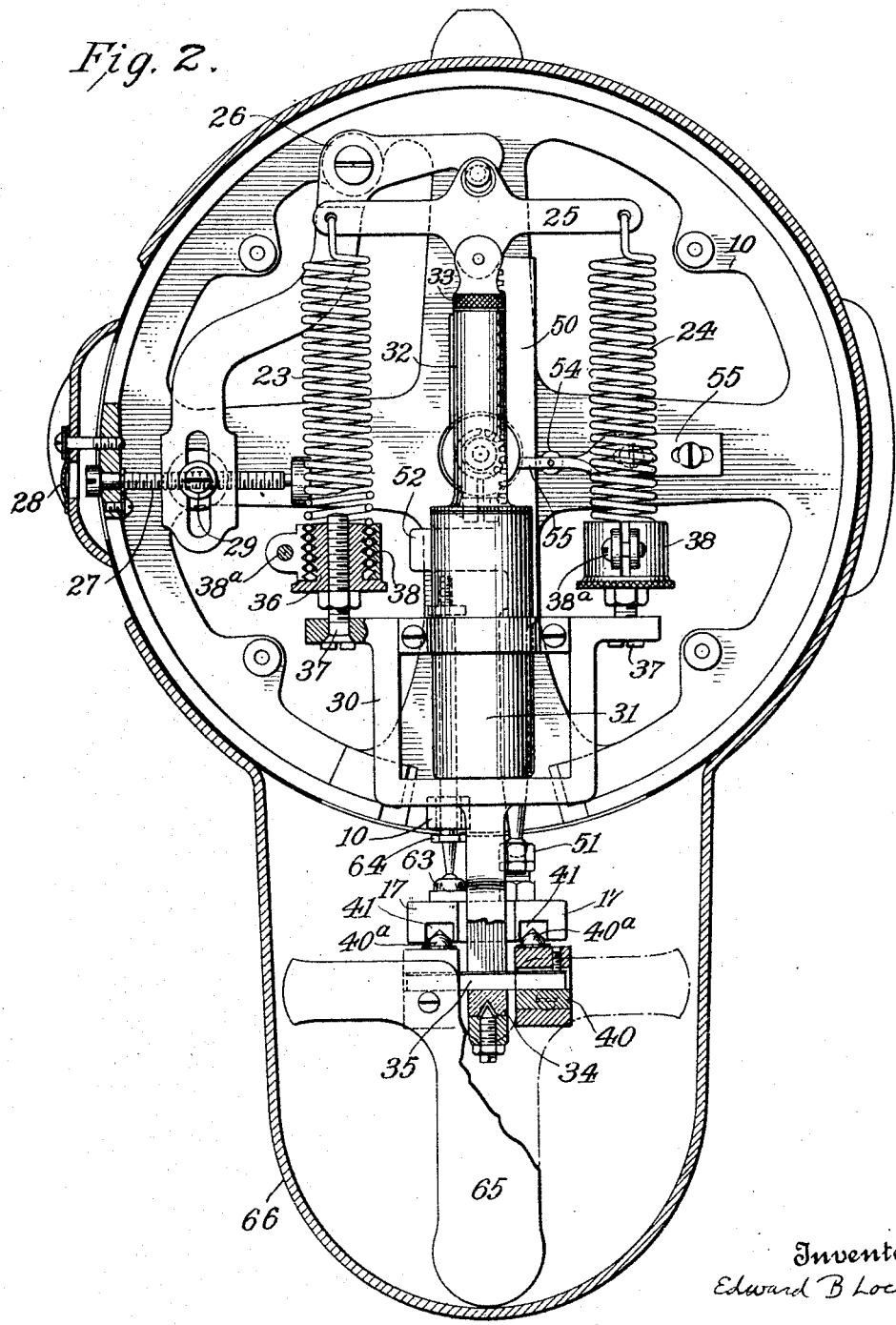

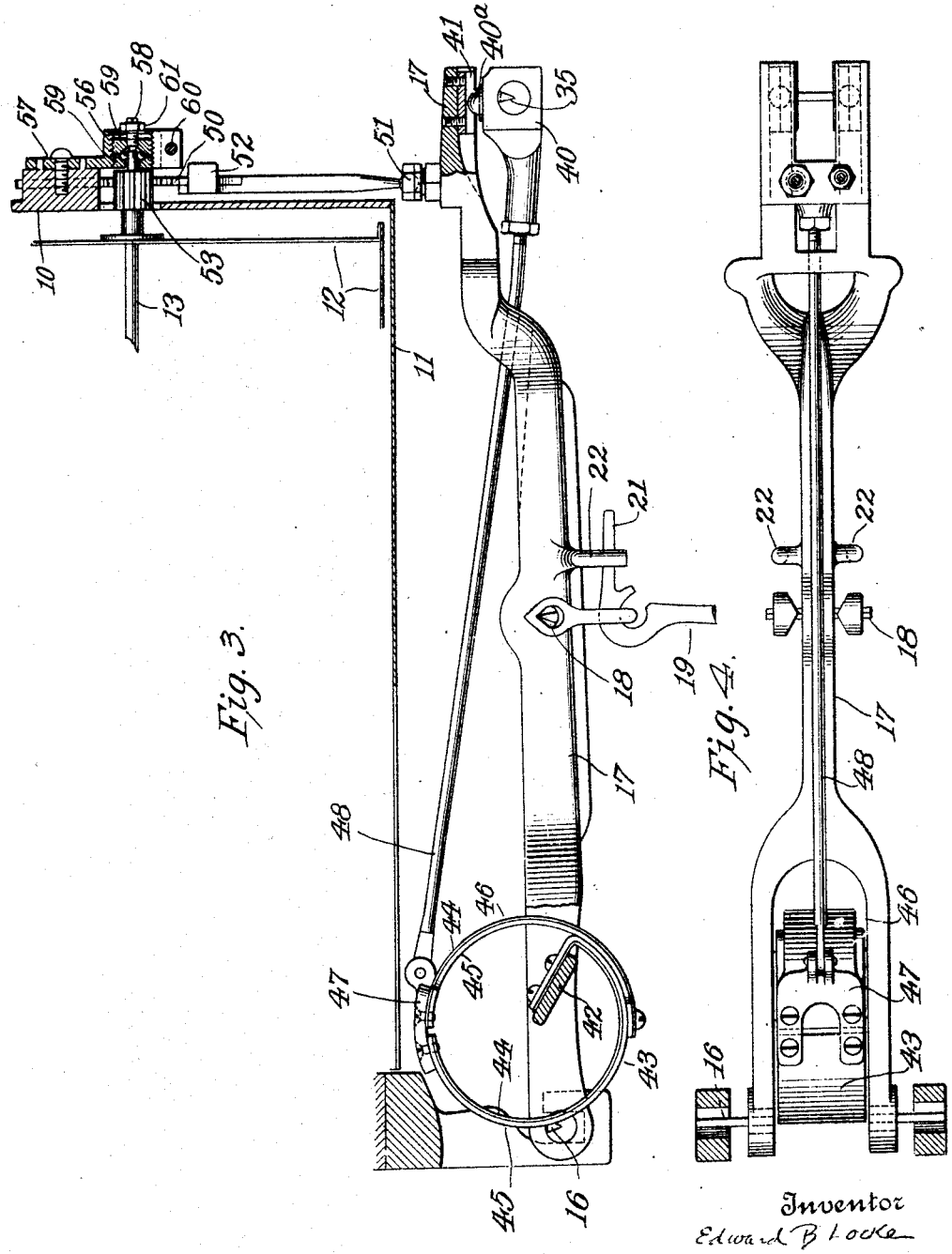

1,539,585

UNITED STATES PATENT OFFICE.

EDWARD B. LOCKE, OF DAYTON, OHIO, ASSIGNOR, BY MESNE ASSIGNMENTS, TO DAYTON SCALE COMPANY, OF DAYTON, OHIO, A CORPORATION OF NEW JERSEY.

SCALE.

Application filed April 15, 1921. Serial No. 461,556.

*To all whom it may concern:*

Be it known that I, EDWARD B. LOCKE, a citizen of the United States of America, residing at Dayton, in the county of Montgomery and State of Ohio, have invented certain new and useful Improvements in Scales, of which the following is a full, clear, and exact description.

The present invention relates to improvements in weighing scales and more particularly to the improvement of the general construction of the scale, to the end that the weighing of goods may be effected more accurately than heretofore.

Other objects reside in the improvement of certain adjustment devices in order to simplify the assembling and sealing of the scale.

Other objects reside in the provision of a thermostat of novel construction for compensating for variations in the load counterbalancing springs caused by changes in temperature.

Other objects of the invention will be set forth in further detail in the accompanying specification and shown in the drawings, which describe and show one embodiment of the invention.

In the drawings,

Fig. 1 shows a front elevation of the scale with the housing partly broken away to show the interior construction.

Fig. 2 is an end view with cover plates removed and certain parts shown in section.

Fig. 3 is an enlarged detail showing a side view of the lever and thermostat and the connections to the springs and indicator.

Fig. 4 is a top plan view of the lever and thermostat assembly.

In more detail, the scale which is here shown is of the hanging type and comprises suitable end frame members 10, suitably supported in a drum housing 11 provided with a suitable suspension loop opening 11ª and having the usual window opening in the front and rear thereof to display the weight and price chart 12 to the operator and the customer. The chart is of the usual drum type well known in the art, and is mounted upon a shaft 13 (Fig. 1).

The left hand frame member 10 is provided with depending brackets 14 which support suitable V-bearings 15. Supported by knife edge pivots 16 in these bearings is a scale lever 17. This lever extends across transversely under and parallel to the drum and at its opposite ends connects to the indicating drum and spring counterbalance. Intermediate its ends this lever carries knife edge pivots 18 which through a loop and a link 19 support the usual goods receiver or pan 20. Heretofore in hanging scales it has been found that an oscillatory movement of the pan is set up when a load is thrown thereon and this oscillatory or rotary movement has in frequent instances cramped the loop against the knife edges thereby damaging or even breaking the same. To prevent this objectionable action I provide an extension 21 on link 19 which normally lies intermediate two stops 22 which depend from the lever 11. Should oscillatory movement occur the shock or impact will be taken up between the member 21 and the stops 22 and not between the loop and its cooperating pivot.

*Automatic counterbalance.*

To automatically counterbalance the applied load I provide two springs 23, 24. These springs at their upper ends are connected to an evener bar 25 which at the center is pivotally supported upon a stud carried by a rocking lever 26. Zero adjustment of the springs is secured by rocking the evener bar about its pivot by means of a screw 27. This screw extends to a point adjacent the drum housing and access thereto is had by shifting a cover 28. The screw is fixed against endwise movement and carries a threaded block 29 which engages a slot in the lever 26 thereby rocking the same upon the rotation of the screw.

The springs at their lower ends are connected to a yoke member 30. To this yoke is clamped a dash pot comprised of a large cylinder 31 and a smaller cylindrical tube 32. The usual piston (not shown) moves to and fro in the large cylinder and the piston rod extends through the small tube and connects by a suitable pin to the evener 25. The smaller tube prevents the spilling of the oil from the dash pot when the scale is in use, and when the scale is to be shipped the open end of the small tube may be sealed by a suitable threaded plug 33 carried by the piston rod.

The lower end of the yoke is shaped to support a bearing 34 which cooperates with a pivot 35 upon the scale lever.

In weighing scales where springs are employed it is important to be able to accurately adjust and fix the length of the extensible portion of the spring or springs and the adjustment means should be so constructed that the setting be maintained when the scale is in use. It is important that the number of effective convolutions of the spring, subject to flexure, should not change when the scale is in use. To provide for such adjustment I employ plugs 36 which are interiorly threaded to receive the adjustable fastening means 37 extending to the yoke and exteriorly threaded to fit the convolutions of the springs 23, 24. The plugs may be thus threaded into the springs to any desired extent and thereby render ineffective and not subject to flexure any desired number or fraction of convolutions thereof. To maintain the setting I provide interiorly threaded slotted collars 38 which fit the convolutions of the springs and are clamped thereto by screws 38ª. After the screws are tightened the collars are clamped tightly to and prevent any relative shifting of the springs and the plugs.

Thermostat.

As customary in spring scales I provide a thermostatic means for adjusting the position of the pivot 35. The thermostat is adapted to shift the pivot horizontally to effect proper running or load balance and vertically relative to the range line of the lever to secure the proper zero balance.

The pivot 35 is adjustably mounted in a bifurcated block 40 (Figs. 2, 3 and 4). The yoke bearing engages the pivot 35 between the bifurcations (see Fig. 2). Block 40 carries two balls 40ª which seat in raceways 41 which are securely fastened in slots in the bifurcated end of the scale lever 17. The raceway surfaces are slightly inclined to the range line of lever 17 to increase the tension of the springs when the block is shifted outwardly relative to the main lever pivots 16. To effect the in-and-out shifting of the block 40 and secure a variation in the leverage ratio of the lever and the aforesaid up-and-down shifting of the pivots, I provide a thermostat of novel construction. Lever 17 is bifurcated adjacent its pivots 16 and to a cross bar 42 there is rigidly secured a thermostatic member in the form of a semi-circular ring 43 composed of two metals 44 and 45, the latter being upon the outside and having the higher coefficient of expansion. To ring 43 is rigidly secured a similar semi-circular ring 46 which has the metal, having the higher coefficient of expansion, disposed upon the inside. The ends of parts 43 and 46 are both connected to a member 47 to which a rod 48 is pivotally secured. Rod 48 at its opposite end is adjustably connected to block 40.

When temperature increases the part 43 will curl up and 46 will uncurl. Member 47, rod 48 and block 40 will move to the right (Fig. 3). Under falling temperature conditions the operation will be reversed and 46 will curl up and 43 uncurl. This arrangement gives a more reliable control of the pivot block than the constructions heretofore employed. The conjoint curling and uncurling actions of the semi-circular rings react to impart a common adjustment to the pivot block and thereby exactly position the same irrespective of whether the temperature is rising or falling. Lost motion in the thermostat is also prevented.

Indicator drive.

In order to variably position the indicator (here shown as a drum) in accordance with the variable displacement of the lever, I provide a rack 50 which is connected by a ball and socket joint 51 with one of the bifurcated ends of the lever. The rack is provided with a suitable enmeshing weight 52 to lightly enmesh the rack with a pinion 53 carried by the drum shaft 13. To guide the rack and prevent jumping out of mesh I provide a roller 54 adjustably mounted to slightly clear the rear of the rack, upon an adjustable bracket 55 which has extended portions to guide the side of the rack. The shaft 13 is extended beyond the pinion and is rotatably supported in a ball bearing 56 carried by a bracket 57 which is secured to the frame. Endwise movement of the shaft is prevented by threaded screws 58 which are pointed to engage the end of the shaft and permit the same to rotate with the minimum friction. The bearings are provided with bearing cones 59 which are threaded to permit the adjustment of the bearings 56 in the bracket, and after the adjustment is secured it is maintained by clamping the parts of the bracket together by means of a screw 60. The screws 58 are threaded into the outer cones to permit the position of the screws to be adjusted and the setting is maintained by suitable lock nuts 61.

In order to prevent overrunning of the rack and to limit the extreme movements of the lever, I provide a stud 62 (Figs. 1 and 2) connected by a ball and socket joint 63 with one of the bifurcated ends of the lever 17. The stud passes loosely through an opening in a bracket from the frame 10 and is provided with suitable adjustable limiting stops 64 to limit the up and down movement thereof.

To prevent objectionable shifting of the lever 17 when the scale is being shipped I provide a T-shaped plate of sheet metal 65 which is fastened to the ends of the lever by suitable screws and which cooperates with the walls of the lever housing 66 to prevent the shifting of the lever. When the scale is to be put into use the T-shaped plate is removed and thereafter the lever is free to swing upon its bearings.

I claim:

1. In a scale, in combination, a weight indicator, a pinion therefor, an element displaceable in accordance with the applied load, a rack meshing with the aforesaid pinion and having a ball and socket connection with said movable element, and an enmeshing weight carried by said rack to enmesh the same with the pinion.

2. A weighing scale comprising a scale lever having a bifurcated nose iron, V-guides carried thereby, a pivot block having a single ball cooperating with each of the said V-guides and thermostatic means carried by the lever for shifting the block.

3. A weighing scale comprising a scale lever having a bifurcated nose iron, a main pivot and a load pivot upon said lever, a guideway carried by each of the forked ends of the lever, a pivot block carrying two balls, each ball fitting one of the said guideways, said guideways having the line of travel of the said balls inclined to the range line of the lever for the purpose described, and thermostatic means for shifting the pivot block back and forth.

4. A hanging scale having a lever, a load pivot thereon, a loop and a connected link, an article pan suspended from said link, means for checking oscillatory movements of the said pan and associated linkage, comprising a pair of arms depending from the lever and a finger extended from the link and adapted to abut against said arms carried by the lever.

5. In a weighing scale having in combination a spring load counterbalancing means and a part in said scale adapted to be shifted to compensate for the variations in said spring counterbalancing means under varying temperatures, means for shifting said part comprising a plurality of connected thermostatic members each of said members being substantially semicircular, one of said members being adapted to coil up under increased temperature and the other of said members being adapted to uncoil under corresponding temperature changes, and connections from said members to said shiftable part.

6. In a weighing scale, in combination with spring load counterbalancing means, a shiftable controlling element having provisions for compensating the scale for variations due to changes in temperature of said load counterbalancing means, thermostatic devices connected to said part and comprising a plurality of curved coacting thermostatic members, one of said members being adapted to curl and the other coacting member being adapted to concurrently uncurl upon a change in temperature, whereby said part is positively moved in both directions.

7. In a weighing scale, in combination, an adjustable end connection for a counterbalancing spring comprising a plug having threads to engage the convolutions of the spring, a collar interiorly threaded to receive the said spring and means for clamping the collar to tightly hold the spring in place.

8. In a weighing scale, in combination with a spring of an adjustable end connection therefor, comprising a plug fitting within the spring having an adjustable connection with a cooperating part, a collar having interior threads to conform to the convolutions of the spring, and means for clamping said collar and thereby tightly holding the spring in its adjusted position upon the plug.

9. A thermostat for compensating the springs of a weighing scale for temperature changes, comprising a plurality of curved coacting thermostatic members, one of said members being adapted to curl and the other to uncurl under a change of temperature, and a part connected to both said members and adapted to be displaced by the conjoint action thereof.

10. A weighing scale having a lever, an adjustable pivot block and a connected spring, of a thermostat carried by the lever and comprising a plurality of curved thermostatic members one of said members being adapted to curl and the other to uncurl upon a similar change of temperature, and a common connection from both said members to the pivot block to adjust the latter relatively to the lever.

11. In a scale, in combination, a lever, a fulcrum therefor, a load pivot connected to the goods support, spring counterbalancing means for said lever, a connection between the spring and lever shiftable longitudinally of the lever to compensate for change in the flexibility of the spring counterbalancing means at different temperatures, and vertically to compensate for elongation and contraction of the spring due to temperature changes, thermostatic means for effecting the shifting movements of said connection in both directions, said connection comprising thermostatic elements which curl and uncurl upon one movement of the connection and which uncurl and curl for reverse movements of the connection.

In testimony whereof I hereto affix my signature.

EDWARD B. LOCKE.